Oct. 23, 1962     O. J. M. SMITH     3,060,378
METHOD AND APPARATUS FOR GENERATING A SIGNAL AND A
SYSTEM AND METHOD FOR UTILIZING THE SAME
Filed Dec. 22, 1958     8 Sheets-Sheet 1

INVENTOR.
Otto J. M. Smith
BY
ATTORNEYS

FIG_4_

FIG_6_

FIG_7_

FIG_8_

FIG_9_

A

B

C

D

E

INVENTOR.
Otto J. M. Smith
BY
ATTORNEYS

FIG_10_

S-Plane $\mathcal{I}_m = \tan \Psi = \cot \theta$
$\mathcal{I} = \sin \Psi = \cos \theta$

FIG_13_

FIG_14_

INVENTOR.
Otto J. M. Smith
BY
ATTORNEYS

FIG_11_

FIG_12_

United States Patent Office 3,060,378
Patented Oct. 23, 1962

3,060,378
METHOD AND APPARATUS FOR GENERATING A SIGNAL AND A SYSTEM AND METHOD FOR UTILIZING THE SAME
Otto J. M. Smith, Berkeley, Calif., assignor to Electro-Measurements, Inc., Portland, Oreg., a corporation of Oregon
Filed Dec. 22, 1958, Ser. No. 782,069
38 Claims. (Cl. 324—57)

This invention relates to a method and apparatus for generating a signal of a particular type and a system and method for utilizing the signal for measuring individual resonances and time constants in a complex system.

Engineers have long been faced with the problem of finding an analytical description of a physical system. To date the methods of analysis have been confined to steady state frequency response analyses and transient response analyses. The chief problems encountered in either method have been first finding an algebraic equation to represent the experimental data and second having the equation factoring it. In the last decade root locus techniques have become widely used for the analysis and design of feedback control systems. However, such techniques required factored algebraic equations in the form of $s$-plane pole-zero locations to describe the system. Normally, such equations are determined by the laborious process of synthesizing algebraic equations from experimental curves. For example, in servomechanism work, the characteristics of systems have oftentimes been determined by the measurement of gain and phase shift as a function of frequency and a plot of these measurements made which is called a Bode plot. The interpretations of the Bode plot requires the empirical fitting of a set of templates or predetermined curves to the plot. This, at best, is a tedious method for determining the resonances and time constants of a system. There is a need for a method and apparatus for generating a signal which utilizes zeros in the Laplace transform of the signal and for a system and method for utilizing such a signal for measuring individual resonances and time constants in a complex system.

In general, it is an object of the present invention to provide an apparatus and method for generating a signal and a system and method for utilizing the signal so generated to locate individual resonances and time constants in a complex system.

Another object of the invention is to provide an apparatus and method of the above character in which the signal produced contains zeros in the Laplace transform of the signal.

Another object of the invention is to provide a system and method of the above character by which the characteristic pole locations of the system being analyzed can be found readily.

Another object of the invention is to provide an apparatus and method of the above character in which the zeros are produced by summing two signals.

Another object of the invention is to provide an apparatus and method of the above character in which the signal is produced by the summation of two steps.

Another object of the invention is to provide an apparatus and method of the above character in which the Laplace transform of the signal has a single pole at the origin and in addition an infinite column of complex zeros.

Another object of the invention is to provide an apparatus and method of the above character in which the complex zeros are of high frequency.

Another object of the invention is to provide a system and method of the above character in which the above signal is used to excite the system being tested.

Another object of the invention is to provide a system and method of the above character in which the transient response from the system being tested will have one component missing.

Another object of the invention is to provide a system and apparatus of the above character in which the apparatus for generating the signal can be adjusted until one of the frequencies in the transient response in the system being tested has been completely removed.

Another object of the invention is to provide a system and apparatus of the above character in which the dials of the generating apparatus will read the frequency and damping of the frequency which has been completely removed.

Another object of the invention is to provide a system and method of the above character in which the frequency, the amount of resonant rise and damping can be readily determined.

Additional objects and features of the invention will appear from the following description in which the preferred embodiments have been set forth in detail in conjunction with the accompanying drawings.

Referring to the drawings.

In general, the present invention consists of a signal generator in which a repeated square wave is generated and a repeated pulse or square wave is generated which has a repetition rate integrally related to the first square wave frequency and which is added to the first square wave to produce a plurality of double-step output signals from the generator. The double-step output signals contain complex zeros which are utilized for test purposes. In testing a system to determine the resonances and time constants of the system, the output of the signal generator is applied to the system to generate a transient response. The double-step signal is adjusted by varying the spacing between the double-step signals and the amplitude ratios of the waves forming the double-step signal until one of the frequencies or components of the transient response has been completely removed. The dials of the generator will then give a reading of frequency and damping of the component which has been completely removed.

Figure 1:
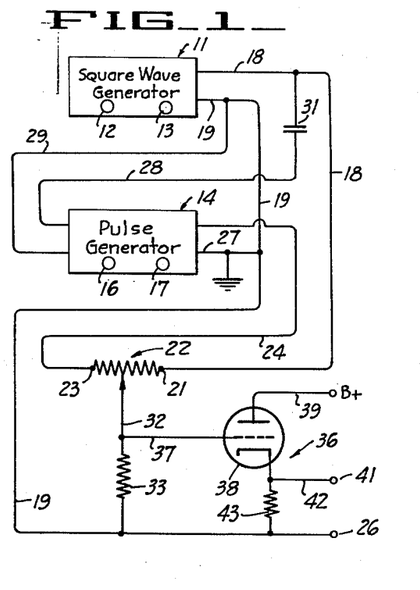
FIGURE 1 is a circuit diagram partly in schematic form of a complex zero generator embodying the present invention.

Referring to the drawings, a signal generator is shown in FIGURE 1 of the drawing. As shown, it consists of a square wave generator 11 of a type well known to those skilled in the art such as type #161—#162 manufactured by Tektronix which delivers a repetitive square wave whose frequency can be adjusted by a dial 12 and whose amplitude can be adjusted by a dial 13.

A pulse generator 14 of conventional design such as a Tektronix Type #161, is utilized which delivers a repetitive pulse of a short time duration whose width can be varied by a dial 16 and whose amplitude can be varied by a dial 17. In other words, the pulse generator produces a periodic wave that has only two values and which changes suddenly between the two values. The output of the square wave generator 11 is connected to conductors 18 and 19. Conductor 18 is connected to a terminal 21 of a potentiometer 22. Terminal 23 of the potentiometer is connected to the output of the pulse generator 14 by conductor 24. Conductor 19 is connected to the output terminal 26 of the complex zero generator. Conductor 19 is also connected to the output of the pulse generator 14 by a conductor 27 which is grounded as shown.

Conductors 18 and 19 are connected to the synchronizing trigger input of the pulse generator 14 by conductors 28 and 29, so that the repetition rate of the pulses generated by the pulse generator 14 is equal to the repetition rate of the square waves generated by the generator 11. The conductor 28 is connected to the conductor 18 through a capacitor 31. The capacitor 31 serves to differentiate the signal appearing from the output of the square wave generator 11 to convert the square wave into an alternating sequence of narrow sharp pulses which are applied to the trigger input of the pulse generator 14. The sliding contact 32 of the potentiometer 22 is connected to the conductor 19 through a resistor 33. The sliding contact is also connected to isolating means 36 by conductor 37. As shown, the isolating means 36 consists of a vacuum tube 38 provided with plate, grid and cathode elements as shown. The conductor 37 is connected to the grid of the tube. The vacuum tube 38 is operated as a cathode follower with its plate connected to the positive voltage supply designated as B+ by a conductor 39 and with its cathode connected to the output terminal 41 by a conductor 42 and also to a resistance 43 which is connected to the common ground conductor 19. The primary purpose of the tube 38 is to isolate the effect of any load placed across the terminals 26 and 41 upon the generators 11 and 14 and the potentiometer 22.

Figure 2:
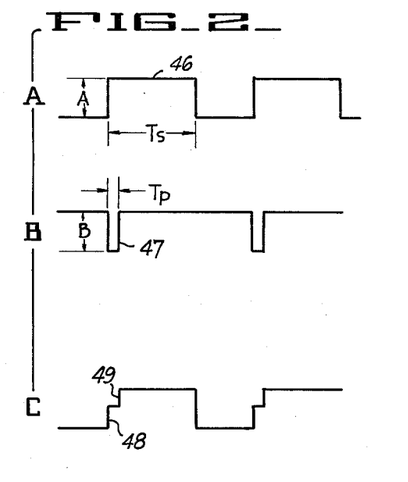
FIGURES 2A, 2B and 2C are curves showing the wave forms delivered by various parts of the complex zero generator.

The operation of the complex zero generator shown in FIGURE 1 may now be briefly described as follows: The output of the square wave generator 11 is shown in FIGURE 2A. As hereinbefore explained, the dial 12 controls the frequency or repetition rate of the square waves 46. It controls the time $T_s$ shown in FIGURE 2A. Dial 12 is adjusted to any convenient low frequency such as two cycles per second. Dial 13 controls the amplitude A of the wave as shown in FIGURE 2A and is adjusted to a convenient amplitude as for example 1 to 5 volts.

The output of the pulse generator 14 is shown in FIGURE 2B and consists of pulses 47. Dial 16 controls the width of the pulse which is a function of time $T_p$ as shown in FIGURE 2B. Dial 17 is used for adjusting the amplitude B of the pulse. Dial 17 is usually adjusted so that the instantaneous peak voltage appearing on the output of the pulse generator 14 is exactly equal to the voltage on the output from the square wave generator 11. That is, so that B is equal to A.

The time relationship between the square wave 46 and the pulse 47 is achieved through the connections 28 and 29 between the square wave generator 11 and the trigger input of the pulse generator 14. The synchronizing input of the pulse generator 14 is adjusted so that the start of the pulse 47 delivered on the output of the pulse generator 14 coincides with the beginning of each square wave 46. The signal from the square wave generator 11 and from the pulse generator 14 are applied across the potentiometer 22 which provides a summation of the signals in a proportion determined by the setting of the slider 32. The movement of the slider 32 changes the relative magnitudes of the contributions to the voltage on the grid of the tube 38. Movement of the slider 32 therefore changes the relative magnitude of the first and second step functions 48 and 49 in each repeated cycle as shown in FIGURE 2C. FIGURE 2C shows a typical output appearing across the terminals 26 and 41 of the complex zero generator. This wave shape is the summation of the two repetitive signals from the square wave generator 11 and the pulse generator 14 and is a measure of the voltage appearing on the grid of the tube 38. In other words, this wave shape consists of at least three step functions in each cycle, two up and one down, and which is substantially flat between the step functions.

As is well known to those skilled in the art, the voltage which appears from the cathode to ground and across the output terminals 26 and 41 is substantially equal to the voltage appearing between the grid and ground. The advantage of such a cathode follower circuit is that the voltage appearing across the terminals 41 and 26 is capable of being loaded with a much lower impedance than it is possible to place between the grid of the tube and ground.

The relative magnitude of the first and second steps 48 and 49 is determined by the positioning of the slider 32. The first step function 48 is the difference between a signal which is a part of magnitude A, minus a part of magnitude B. The second step function 49 is due to the removal of that part of the pulse amplitude B which had entered into the voltage on the grid of the tube 38. Therefore, by controlling the position of the slider 32, it is possible to change the ratio of amplitude of step 48 to the amplitude of step 49 through a range of from 0 when the slider is at terminal 21 to infinity when the slider is on terminal 23. Therefore, when the slider 32 is connected to terminal 21, then the ratio of the amplitude of the step 49 to step 48 is 0. As the slider is moved from this position, the ratio of step 49 to step 48 becomes a small number. When the slider is moved so that it is at a mid-resistance position of the potentiometer 22, then the wave in FIGURE 2C is made up of approximately equal portions of the square wave 46 of amplitude A and the pulse 47 of amplitude B and this produces a ratio of amplitude of the step 49 to the amplitude of step 48 which approaches positive infinity. This particular adjustment of the complex zero generator produces a signal with complex zeros that are in the right hand s-plane which is not often required for testing stable systems as hereinafter pointed out.

As the slider is moved from this mid-point position towards the terminal 23, there is a greater amount of pulse signal introduced into the voltage onto the grid of the tube 38 than there is of the square wave signal and, therefore, the magnitude of the step 49 is larger than the magnitude of the step 48. In addition, they have opposite signs. For this case then, the ratio of these magnitudes varies from minus infinity through all negative numbers down to minus zero. This region of adjustment of the slider 32 is particularly useful for measurement of real time constants as distinguished from oscillations as hereinafter pointed out.

As is well known to those skilled in the art, the pulse generator 14 is normally equipped with a reversing switch so that the polarity of the chain of output pulses appearing on the output of the generator can be either positive or negative. Through the use of this reversing switch, the wave shape appearing in FIGURE 2C can be adjusted so that there is produced either a complex zero wave or a wave which produces a real zero on the real axis of the Laplace *s*-plane. In the wave shape shown in FIGURE 2C, the pulses are of negative polarity and produce a wave shape which contains complex zeros. The combination of the negative pulses 47 and the positive square waves 46 produce double-steps 48 and 49 which both have the same polarity. This produces a complex zero. When the amplitude of the step 49 is greater than the amplitude of the step 48, the complex zero is in the right hand *s*-plane and when the amplitude of step 49 is smaller than the amplitude of the step 48, the complex zero is in the left hand *s*-plane.

By using the reversing switch of the pulse generator 14, it is possible to produce an output which has the same wave shape as shown in FIGURE 2B except that the pulses are positive. When such positive pulses of the height B and pulse duration $T_p$ are added to the square wave of height A and a duration of $T_s$, the resulant wave would produce a second step of opposite polarity to the first step. This combination produces a real zero which can be used to cancel time constants, that is poles which lie on the real axis of the Laplace *s*-plane.

The frequency of the square wave generator 11 is set sufficiently low so that all of the transients excited by the steps in the wave form in FIGURE 2C have died out in a time of one-half cycle.

By way of example, one complex zero generator found to operate very satisfactorily had components of the following types and values.

| | |
|---|---|
| Square wave generator 11 | Tektronix Type 162 and 161 in conjunction. |
| Pulse generator 14 | Tektronix Type 161. |
| Capacitor 31 | 0.01 microfarads. |
| Potentiometer 22 | 50,000 ohms. |
| Resistance 33 | ½ megohm. |
| Resistance 43 | 1,000 ohms. |
| Tube 38 | RCA 6J5 high mu triode B+ 250 volts D.C. |

This complex zero generator delivered a wave form like that shown in FIGURE 2C.

Figure 3:
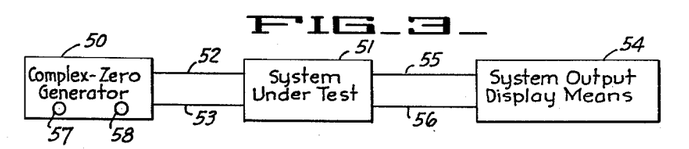
FIGURE 3 is a block diagram of a system utilizing the complex zero generator.

In FIGURE 3, in block diagram form, is shown a test system utilizing one of my complex zero generators. The complex zero generator 50 as shown in the drawing is connected to the input of the system 51 under test by conductors 52 and 53. The output of the system 51 is connected to display means 54 by conductors 55 and 56. The display means 54 can be of any suitable type such as a conventional oscilloscope or oscillograph.

The complex zero generator 50 is provided with two dials 57 and 58. Dial 57 is calibrated in frequency and dial 58 is calibrated in damping. The dial 58 corresponds to the slider 32 in FIGURE 1. As the dial 58 is rotated, the position of the slider 32 on the potentiometer 22 is varied between terminals 21 and 23. Dial 57 corresponds to dial 16 in FIGURE 1 and serves to control the timing $T_p$ of the pulses 47. As shown, this timing is adjusted so that it is equal to the period of the oscillation frequency which is being measured. After the other dials of the generators 11 and 14 have been set up properly, they need not be adjusted during the test and for that reason they have not been shown on the exterior of the complex zero generator 50.

As hereinbefore explained, the dials 13 and 17 are merely adjusted so that the output voltages from the generators 11 and 14 are equal. Dial 12 is set to adjust the repetition rate of the double pulses or double-step functions to a convenient low frequency.

Operation of the test system shown in FIGURE 3 may now be briefly described as follows: Assuming that the complex zero generator has been connected to the system under test as shown and that an oscilloscope has been connected to an output, the output of the system can be observed on the oscilloscope or display means 54. The complex zero generator 50 delivers a repetitive wave of the type hereinbefore described. The oscilloscope 54 is synchronized with this repetitive wave so that one can observe on the oscilloscope at least one full half cycle of the lowest frequency in the repetitive wave. On the oscilloscope will appear a form of transient response of the system 51 repeated at periodic intervals and superimposed one on top of the other.

By varying the dial 57, the time in between the first and second step functions 48 and 49 in each cycle as delivered by the complex zero generator 50 can be varied. When the frequency dial 57 is set to read a high frequency, the two step functions are close together. When the dial is set to read a low frequency, the step functions are far apart. Preferably, one should start with the frequency dial set to a very high frequency and then reduce the frequency until a minimum in the envelope of oscillation is observed on the oscilloscope 54. The dial 58 is then varied to change the ratio of amplitude of the first to the second step in each cycle of the output of the complex zero generator. This change in ratio will cause a change in the observed transient on the display oscilloscope 54. The dial 58 is varied until the transient oscillation is further reduced to a minimum. This sequence is repeated by first varying the dial 57 and then the dial 58 until one of the frequencies which has been observable in the display is completely removed from the transient. At this instant, the values of the frequency and damping of the component which have been removed from the transient can be read directly on the dials 57 and 58. As pointed out hereinafter, the dials 57 and 58 are calibrated in such a manner so that this is possible.

Figure 7:
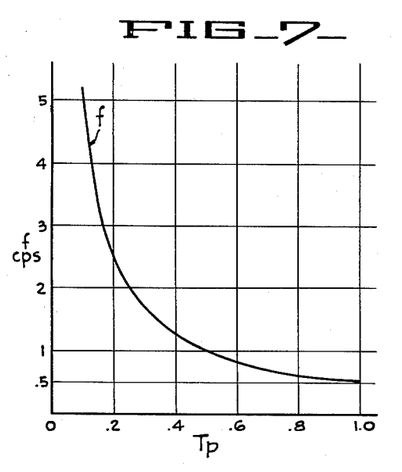
FIGURES 7 and 8 are graphs showing the dial calibrations for the complex zero generator.
Figure 8:
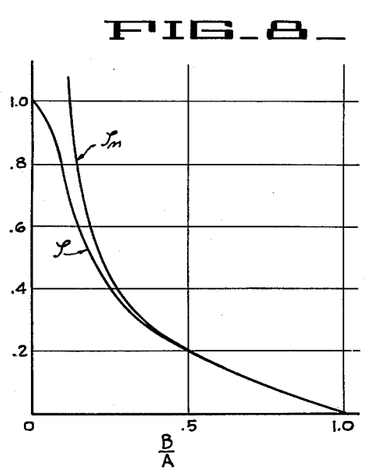

The calibrations for the dials 57 and 58 are derived in the following manner.

The Laplace transform of a unit step function at time zero is given by $$\mathscr{L}U(0) = \frac{1}{s}$$

For a delayed step function it is given as $$\mathscr{L}U(T_p) = \frac{e^{-sT_p}}{s}$$

An initial step of magnitude A, to which is added or subtracted a step of magnitude B at time $T_p$, has a Laplace transform $$F(s) = \frac{A}{s} \pm \frac{Be^{-sT_p}}{s} = \frac{1}{s}(A \pm Be^{-sT_p}) \qquad (1)$$

Interpretation of this function shows that there is one pole at the orgin of the *s*-plane $$\left(\text{given by } \frac{1}{s}\right)$$

and many zeros at the places where $A = \pm Be^{-sT_p}$.

Figures 4, 6:
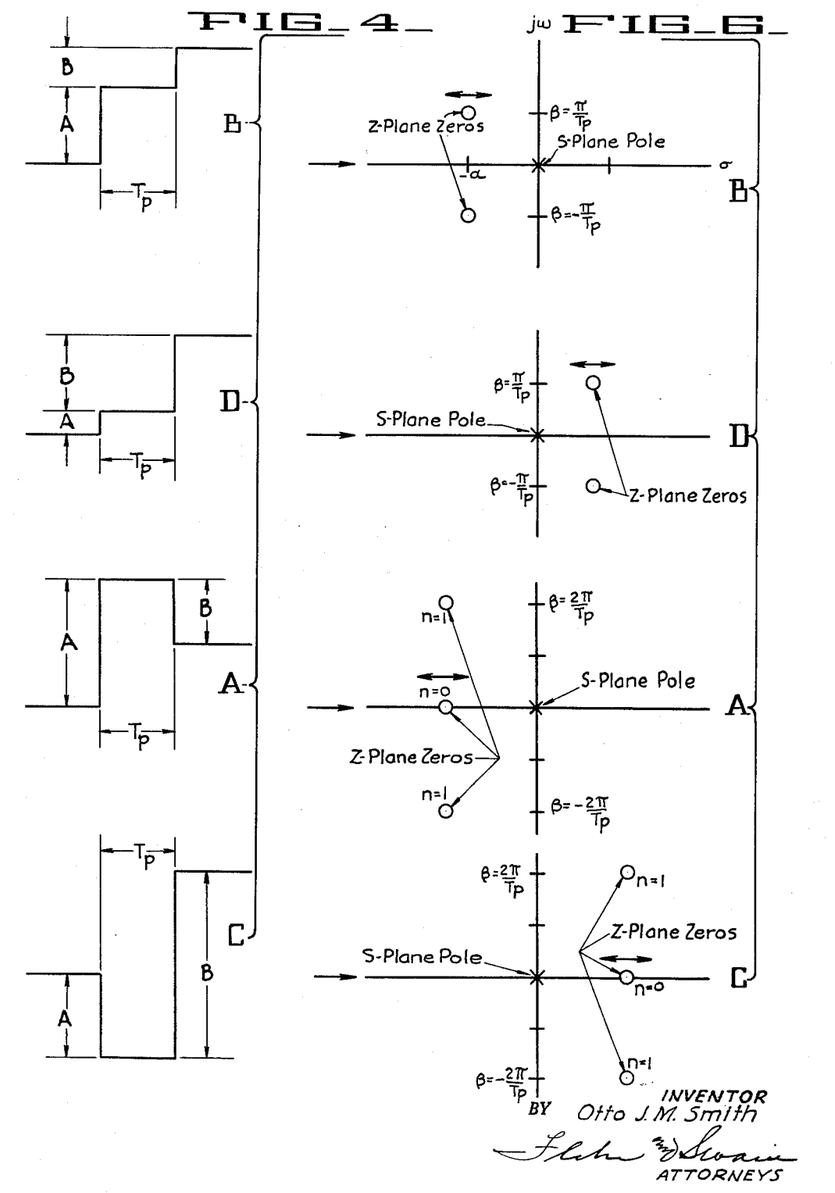
FIGURES 4A, 4B, 4C and 4D show double-step wave forms of various combinations.
FIGURES 6A, 6B, 6C and 6D are pole zero representations of the double-step wave forms shown in FIGURES 4A, 4B, 4C and 4D in the time domain.

Consider first the case when the second step of magnitude B is subtracted. The wave form for this case is shown in FIGURE 4A. The zeros occur where the value of *s* fulfills the condition.

$$A = Be^{-sT_p} \qquad (2)$$

$$e^{sT_p} = \frac{B}{A} \qquad (3)$$

$s$ is a variable in the $s$-plane whose coordinate axes are $\sigma$ and $j\omega$. The roots of Equation 3 give specific values to $s$ and will be denoted by, $s = \alpha + j\beta$. Then, $$e^{sT_p} = e^{(\alpha+j\beta)T_p} = e^{\alpha T_p}(\cos \beta T_p + j \sin \beta T_p) = \frac{B}{A} \quad (4)$$

$$\beta = 2\pi f \quad (5)$$

Since $$\frac{B}{A}$$

is all real, $\sin \beta T_p$ must be zero and $\cos \beta T_p$ must have a magnitude of unity. Since $$\frac{B}{A}$$

is positive, $\cos \beta T_p$ must be plus one. Therefore, $$\beta T_p = \pm 2n\pi \quad (6)$$

when $n$ is any positive integer, $n = 0, 1, 2 \ldots$ This fulfills the conditions, $$\sin(\beta T_p) = 0 \text{ and } \cos(\beta T_p) = +1 \quad (7)$$

Then, $$|e^{sT_p}| = e^{\alpha T_p} = \frac{B}{A} \quad (8)$$

$$\alpha = \frac{1}{T_p} Ln \frac{B}{A} \quad (9)$$

$$\beta = \pm \frac{2n\pi}{T_p} \quad (10)$$

The dimensionless damping ratio $\zeta_n$ is $$\zeta_n = \frac{\alpha}{\beta} = \frac{1}{2\pi n} Ln \frac{B}{A} \quad (11)$$

This first condition may be represented in the $s$-plane by a zero at $$\alpha = \frac{1}{T_p} Ln \frac{B}{A}$$

on the real axis, plus an infinite column of zeros at the same $\alpha$ but each separated from the next in the $\pm j\omega$ direction by $$\frac{2\pi}{T_p}$$

Figure 5:
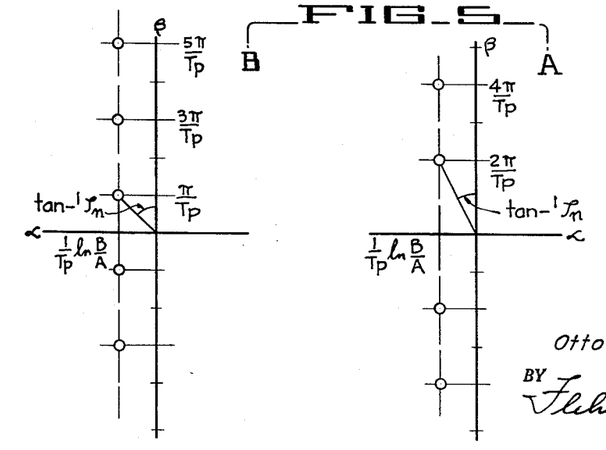
FIGURES 5A and 5B are graphs showing $s$-plane representations.

These are shown in FIGURE 5A.

Consider secondly the case when the second step of magnitude B is added. The wave form for this case is shown in FIGURE 4B. The zeros occur where the value of $s$ fulfills the condition.

$$A = -Be^{-sT_p} \quad (12)$$

$$e^{sT_p} = e^{\alpha T_p}(\cos \beta T_p + j \sin \beta T_p) = -\frac{B}{A} \quad (13)$$

Since $$-\frac{B}{A}$$

is all real, $\sin(\beta T_p)$ must be zero again, and $\cos \beta T_p$ must have unity magnitude. Since $$-\frac{B}{A}$$

is negative, $\cos \beta T_p$ must be minus one. Therefore $$\beta T_p = \pm(2n+1)\pi \quad (14)$$

where $n$ is any positive integer, $n = 0, 1, 2 \ldots$ and where $$\beta = 2\pi f \quad (15)$$

This fulfills the condition, $$\sin(\beta T_p) = 0 \text{ and } \cos(\beta T_p) = -1 \quad (16)$$

Then, $$-|e^{sT_p}| = -e^{\alpha T_p} = -\frac{B}{A} \quad (17)$$

$$\alpha = \frac{1}{T_p} Ln \frac{B}{A} \quad (18)$$

$$\beta = \pm \frac{(2n+1)\pi}{T_p} \quad (19)$$

The dimensionless damping ratio is $$\zeta_n = \frac{1}{(2n+1)\pi} Ln \frac{B}{A} \quad (20)$$

This second condition may be represented by one pair of complex zeros at $$\alpha = \frac{1}{T_p} Ln \frac{B}{A}, \beta = \pm \frac{\pi}{T_p}$$

with an infinite column of zeros again each separated from the next by $$\frac{2\pi}{T_p}$$

as shown in FIGURE 5B.

It becomes cumbersome to speak of an infinite column of zeros, therefore, the following notation will be used:

The transformation $z = e^{sT_p}$ offers the advantage that in the $z$-plane the infinite number of $s$-plane zeros are represented by one $z$-plane zero; this is accomplished by a cork-screw type folding in the conformal transformation. This can be explained as follows:

Since $$z = e^{sT_p} = e^{\sigma T_p} e^{j\omega T_p} \quad (21)$$

It is noted that $$|z| = e^{\sigma T_p} \quad (22)$$

and $$\angle z = \omega T_p$$

Therefore, a constant $\sigma$ line in the $s$-plane transforms into a trajectory in the $z$-plane whose radius is $e^{\sigma T_p}$ (constant) and angle is $\beta T_p$ ($\beta$ is the variable), hence a circle. One revolution in the $z$-plane corresponds to a change in $\omega$ by $$\frac{2\pi}{T_p}$$

in the $s$-plane.

Thus, points on the constant $\sigma$ line in the $s$-plane separated by $$\frac{2\pi}{T_p}$$

lie on top of each other in the $z$-plane. The constant $\sigma$ line can be thought of as spiraling upward around an axis normal to the $z$-plane, passing through the origin, at a constant distance $e^{\sigma T_p}$ and variable angle $\omega T_p$. Hence, the vertical projection of all points separated by $$\frac{2\pi}{T_p}$$

will coincide to give one point in the $z$-plane. One of these spirals can be drawn for every $\sigma$, hence the extension to the model of a plane spiraling upward about the $z$-plane origin as an axis.

Note for $$\begin{array}{ll} \sigma = +\infty & |z| = \infty \\ \sigma = 0 & |z| = 1 \\ \sigma = -\infty & |z| = 0 \end{array} \quad (23)$$

Because of this cork-screw type distortion, it is not convenient to correlate motion of $s$-plane zeros with the motion of their $z$-plane counterparts. Therefore, in the drawings, poles and zeros are pictured on the $s$-plane, each having its own $s$-plane position, but the zeros due to double-steps will be labeled "$z$-plane zeros" to denote their multiplicity, and for clarity the poles will be labeled "s-plane poles." Also, to give immediate meaning to the distances involved between zeros, in the case where $$\beta = \pm \frac{n\pi}{T_p}$$

the $n=1$ zeros are also shown. All zeros are equally spaced.

This notation is used in FIGURES 6A, B, C, and D. FIGURES 6A, B, C and D, give the pole-zero representations of the various combinations of steps shown in FIGURES 4A, B, C and D in the time domain.

The dial 57 of the complex zero generator 50 is calibrated in units of $\beta$ and in units of $$f = \frac{\beta}{2\pi}$$

which varies the timing $T_p$ in FIGURES 4A through 4D in accordance with Equations 10 and 19. The actual dial calibrations are shown in FIGURE 7.

The dial 58 is calibrated in units of dimensionless damping ratio $\zeta_n$ which varies the ratio of $B/A$ in accordance with the Equations 11 and 20. The dial calibrations for this dial are shown in FIGURE 8.

If the system 51 under test has a damped resonant frequency, then oscillations will be observed on the oscilloscope 54. As hereinbefore explained, the dials 57 and 58 are adjusted manually in a manner analogous to balancing a bridge with the intent to minimize or remove the oscillations observed on the oscilloscope.

As a principle, it can be stated that after the last step input (thus the zeros) has been added, if every s-plane pole has a superimposed z-plane zero, the output transient will have reached its final value tangentially, and will remain constant thereafter. This is called deadbeat response; i.e., all derivatives of the output simultaneously become identically equal to zero. Using this principle, the null condition (i.e., when the zeros are exactly on top of the poles) can be determined.

If the null position can be found by changing the positions of the dials 57 and 58 of the complex zero generator which in effect is adjusting the zeros until they are superimposed on top of the poles by varying the double pulse spacing and the amplitude ratio, then the coordinates of the time constants and resonances can be read directly from the dials on the complex zero generator. This null position is determined by observing the display means 54 and observing when all oscillations are completely removed from the pattern appearing on the oscilloscope. When this occurs, one pair of complex zeros from the complex generator 50 coincides exactly in the s-plane with the complex pole pair representing the damped resonant oscillations of the system being tested. The values of $\beta$, $f$ and $\zeta_n$ for the system 51 being tested can then be read directly from the dials of the complex zero generator.

During the adjustment of the dials 57 and 58, when the time is held constant and only the amplitude ratio is varied by the dial 58, the $\beta$ value for the zeros will remain constant, and they will move on a locus of variable $\alpha$ which is parallel to the $\sigma$ axis. If the amplitude ratio is held constant and only the delay of the time of the second pulse is varied such as by movement of the dial 57, the zeros will move on a hyperbola in the s-plane, asymptotic to the $\sigma$ and $j\omega$ axes, so that $\alpha$ is proportional to the reciprocal of $T_p$.

As pointed out above, the complex zero generator 50 delivers into the system 51 under test, two-step functions of given magnitudes with an arbitrary time $T_p$ between them. Speaking generally, the two-step or double-step function is the summation of two signals of the same frequency which have different phases. If the two signals had the same phase, only a single signal would result from the sum of the two signals, however, when the two signals are displaced by a small phase angle and which are added together, there is produced a repetitive wave whose fine detail appears to be a step followed by a second step. However, it should be pointed out that the fact that these pairs of steps are repetitive is not essential to the present invention. A single occurrence of a step followed by a second step is adequate for measuring the characteristics of a signal. System characteristics can also be measured by a pair of spaced impulses in which the spacing would be analogous to the spacing between the steps and the height of the impulses or areas of the impulses would be analogous to the height of the steps. However, a pair of impulses is generally not as satisfactory as a double-step from a practical standpoint because the double-step delivers more energy to the system under test and for that reason the resultant transient disturbance in the system can be more easily measured. The derivative of the resultant transient disturbance using a double-step test function is equal to the disturbance that would be measured if the test function were a pair of impulses.

In conjunction with the foregoing description, the term resonances has been used. When the term resonance is used two different parameters describing the resonance are of interest. On a frequency basis, resonance is spoken of in terms of a resonant frequency and a Q or the amount of the resonant rise in the response of the system at the resonant frequency compared with the response of the system at frequencies significantly removed from the resonant frequency. The resonance can also be described by referring to the transient nature of the resonant system when excited by an impulse or a step function. The excitation of a resonant system will produce an output response which appears to be a damped sinusoidal oscillation. The frequency of the oscillation again describes one parameter of the resonance and the decrement rate describes the other parameter. The decrement rate can be described either in terms of $\alpha$—the per unit decrement per unit of time or in terms of $\zeta_n$—the per unit decrement per radian of oscillation. The relationship between the sinusoidal resonant frequency, the transient resonant frequency and the various decrement factors and the Q of the resonance are well known to those skilled in the art and may be found in text books, as for example, on pages 21 and 22 of Otto J. M. Smith on "Feedback Control System," published by McGraw-Hill in 1958.

The double-step function produced by the complex zero generator 51 produces zeros in the Laplace transform output signal because it is the summation of two signals. As is well known to those skilled in the art, signal generators utilized in the past have always generated repetitive functions as for example, square waves. These can be considered to be formed of a fundamental and a sum of harmonics. The Laplace transform of these repetitive functions is a combination of poles, complex poles in the s-plane at the frequency of the fundamental and the various harmonics. Even a single step function has a Laplace transform which is a single pole at origin. The generator 50 by summing two steps produces a single which has a single pole at the origin but in addition has an infinite column of complex zeros which can be used for the testing operation hereinbefore described. Even though when a repetitive pattern is used and complex poles are generated by the low frequency repetition, it is the fact that each individual transient is formed of the sum of two step functions which ensures that there are high frequency complex zeros available for testing.

The determination of the resonances and time constants of a system is particularly important to an engineer designing control systems. Generally in the design of such systems, it is desirable for the engineer to know the various resonances and time constants of the components which will be assembled to make the system. By utilizing a complex zero generator 50 in conjunction with the overall system shown in FIGURE 3, it is possible for the engineer to obtain this information about each and every component so that additional components usually called anti-hunt networks can be properly designed to make the completed closed loop system when assembled free from objectionable sustained oscillation. It should be pointed out that generally the open loop characteristics of systems are normally measured in order to determine the closed loop characteristics. However, occasionally closed loop systems in their entirety are tested for the resonances and this complex zero generator can also be used for such a purpose.

When a complex system consisting of many resonances and many time constants is being tested, a sequence of measurements must be made utilizing the complex zero generator and the display means 54. Each resonance is measured alone by adjustment of the complex zero generator until that particular resonance disappears from the display means 54.

Figure 10:
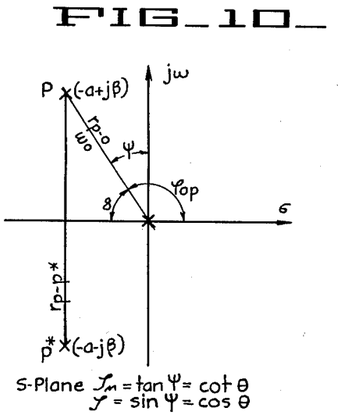
FIGURE 10 shows in $s$-plane nomenclature a complex pole pair step response.
Figure 11:
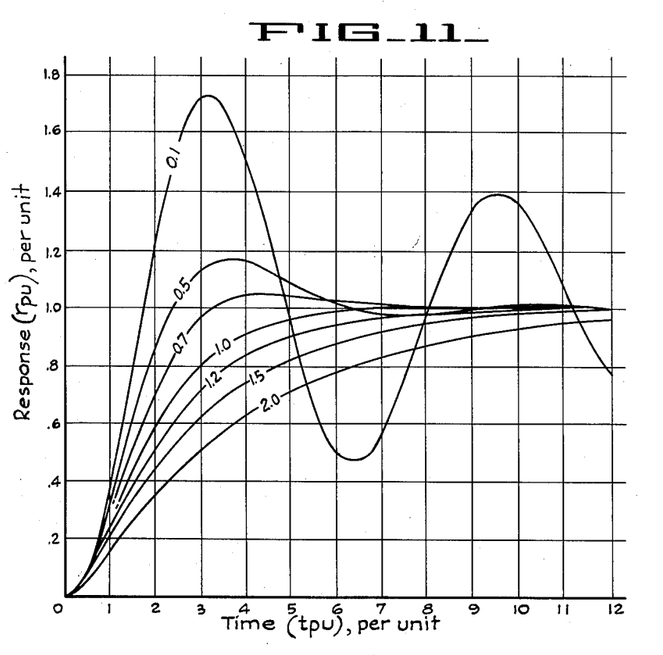
FIGURE 11 is a chart showing step response curves to a step input of a complex pole pair.

By way of example, to illustrate the use of the system shown in FIGURE 3, oscillograms of the tests of such a system are shown in FIGURES 9A, 9B, 9C, 9D, and 9E. The system being tested consists of an RLC circuit (not shown) which had one complex pole pair. The method of investigation carried out in testing such system is to observe on the oscilloscope 54 the response of the system 51 to the signal from the generator 50. For a system under test of this type with a complex pole pair step response as in FIGURE 10, each step response looks like one of the curves in FIGURE 11. The curves shown in FIGURE 11 are in response to a step input of a complex pole pair with $0.1 \leq \zeta \leq 2$.

Figure 9:
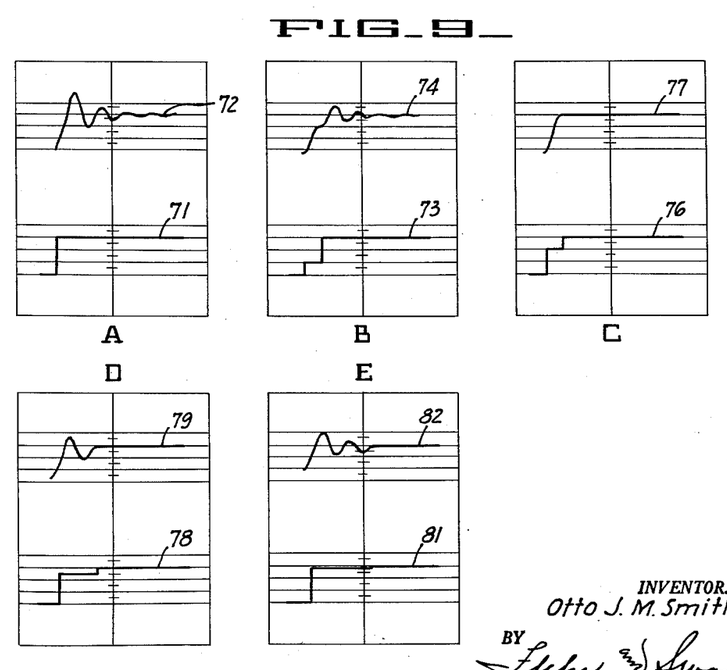
FIGURES 9A, 9B, 9C, 9D and 9E are oscillograms illustrating the various outputs of the system under test.

FIGURES 9A, 9B, and 9C show the summation or resultant response to the complex zero signal from the generator 50. In each of the FIGURES 12A, 12B and 12C, a curve 61 is the response to the first step of the two step input and curve 62 is the response to the second step alone. The curve 63 is the resultant response from the summation of first and second step responses.

Figure 12:
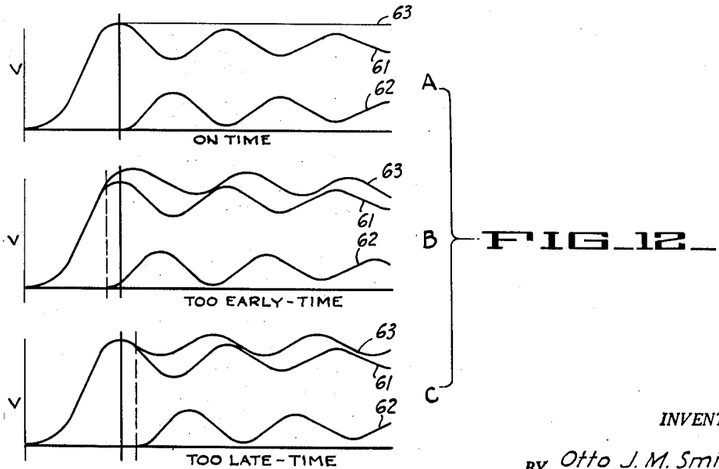
FIGURES 12A, 12B and 12C are curves showing the summation of step responses.

FIGURE 12A shows the resultant response to the complex zero signal when the generator 50 is correctly adjusted. That is the second step is on time. In the drawings in FIGURE 12B and 12C, the second step is too early and too late respectively.

If the response to the signal from the generator 50 is thought of as the addition of the response to the first step and the response to the second step, then the following will be noted:

If the second step occurs at exactly the correct time (i.e. to excite oscillation 180° out of phase with the correct magnitude) then the oscillation components will cancel and there will be a deadbeat response. This is shown in FIGURE 12A. If this second step were too large in magnitude, cancellation would not occur, due to the magnitude differences, and a negative cosine wave oscillation would result, counting time from the instant of the second step. If the second step were too small in magnitude, again cancellation would not occur, and a positive cosine wave oscillation would result.

In the s-plane, this means that the $\beta$ of the zero is correct, but the zeros are respectively to the right of the poles (180° phase shift) and then to the left of the poles (no phase shift).

If the second step is too early in time then one notices a change in response prior to the time the first transient reaches its peak value. Now, due to the phase differences the two do not cancel each other, and a positive sine wave oscillation results, again counting time from the instant of the second step. See FIGURE 12B for such a situation. The resultant lags the first step response oscillation by approximately 90° in phase (hence the transition from positive cosine to positive sine) because the zero is almost directly above the pole in the s-plane.

If the second step is too late in time, any changes are noted in the response after the first transient's peak time. Again the two do not cancel due to phase differences and a negative sine wave oscillation results as can be seen from FIGURE 12C. The resultant leads the original oscillation by approximately 90° in phase (hence the transition from positive cosine to negative sine), because the zero is essentially below the pole in the s-plane.

The magnitude of second step has its corresponding effect on the second and third cases.

In practicing the method, a rule of thumb can be established that first it is desirable to have the steps occur with $T_p = t$ peak, then the proper $B/A$ can be found by trial to give the required deadbeat response.

Figure 13:
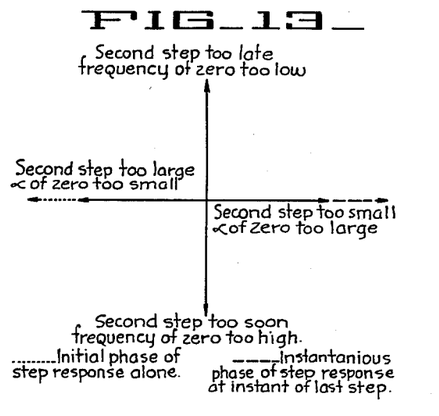
FIGURE 13 is a residue phase diagram for determining corrective procedure.

For such simple cases, a phasor diagram can be constructed upon which the phase of the residual at the instant of the second pulse can be plotted. FIGURE 13 shows such a phasor diagram with the axes marked too early, too small, too late and too large as shown. If the phase of the residual at the instant of the last step is plotted on this diagram, then the necessary corrective action for cancellation can be read as determined from the display means 54. The range of frequency and damping is swept by use of the dials 57 and 58 as hereinbefore described until a null condition is observed which determines the pole locations.

Such procedure in conjunction with one system tested is shown in FIGURES 9A, 9B, 9C, 9D, and 9E.

First the step response for the system was obtained on the oscilloscope 54 as shown in FIGURE 9A. An estimation was then made of the resonant frequency $\omega_n$ and the damping factor $\beta$ from the step response shown in FIGURE 9A and the approximate location for the poles was thereby derived. As hereinbefore explained, the system being tested was a system with a complex pole pair. The step response 72 of the system was obtained by introducing a single step 71 into the system, that is, the second step is equal to zero. A double-step function 73 was then introduced into the system 51 under test in which the first and second steps were approximately equal. The resultant response 74 on the oscilloscope is shown in FIGURE 9B from which it will be noted that the second step was too early in time, that is, the complex zeros were to the left of the pole.

Utilizing the phasor diagram approach hereinbefore described, it was noted that the phase of the resultant response at the instant of the second step was a little less than 180° lag. This corresponded to the third coordinate of the phasor diagram. Therefore, this indicated that the time $T_p$ should be increased (a little) and the magnitude of the second step should be decreased (somewhat) in an attempt to obtain perfect cancellation.

The introduction of the two step wave function 73 introduced z-plane zeros into the approximate location for the poles. The proximity of the zeros to the poles was noted by their effect on the response.

After the interpretation of the transient 74, the time $T_p$ was increased by a small amount and the magnitude of the second step was decreased in an attempt to obtain perfect cancellation. The two step function 76 is shown in FIGURE 9C. The resultant response 77 indicated that a deadbeat response resulted. The pole locations were read directly from the dials of the generator 50 as hereinbefore explained. They also can be obtained from the relationship $$\alpha = \frac{1}{T_p} Ln \frac{B}{A} \text{ and } \beta = \frac{(2n+1)\pi}{T_p}$$

In the above equations, $n$ should be given a value of zero because it will be noted from FIGURE 9C that the deadbeat response occurs at the one-half cycle and that no oscillations are present. When this condition is present, the dials on the generator 50 can be read directly because the ratio is such that it is equal to the ratio of one overshoot to the previous overshoot.

When a two step function 78 of the type shown in FIGURE 9D was used in which the time $T_p$ was made three times as great, with a corresponding reduction in $B/A$, a deadbeat response 79 also appeared on the oscilloscope. However, here there were one and one-half cycles of oscillation, that is, there was a ratio of one overshoot to the third previous overshoot. The one and one-half cycles of oscillation corresponds to an addition of $2\pi$ radians and to an $n$ of unity.

Although the two step function 78 produced a deadbeat response, it did not do so in the minimum possible time. The value of $n$ is the number of extra period (cycles) in the transient response above the minimum possible time for the deadbeat response. With the two step function of the type shown in FIGURE 9D, the frequency on the dial 57 on the generator 50 was divided by three rather than reading it directly as was the case with the results obtained in FIGURE 9C.

In FIGURE 9E is shown a two step function 81 in which the time $T_p$ was made five times as great and $B/A$ reduced a corresponding amount. In the response 82, it will be noted that two extra cycles were completed before deadbeat response. This is an addition of $4\pi$ radians which correspond to an $n$ which equals 2. The frequency read on the dial 57 of the generator 50 was, therefore, divided by five.

In all three of the situations shown in 9C, 9D, and 9E, the complex poles were cancelled and the pole locations determined by reading the dials 57 and 58 and then dividing by the proper number to obtain the frequency and the ratio $B/A$. However, in operation of the system when a condition of the type which is shown in FIGURES 9D and 9E is obtained, the time $T_p$ should be shortened and the zeros pushed up in the $s$-plane to obtain the condition which is shown in FIGURE 9C so that the dials may be read directly without further computation.

Figure 14:
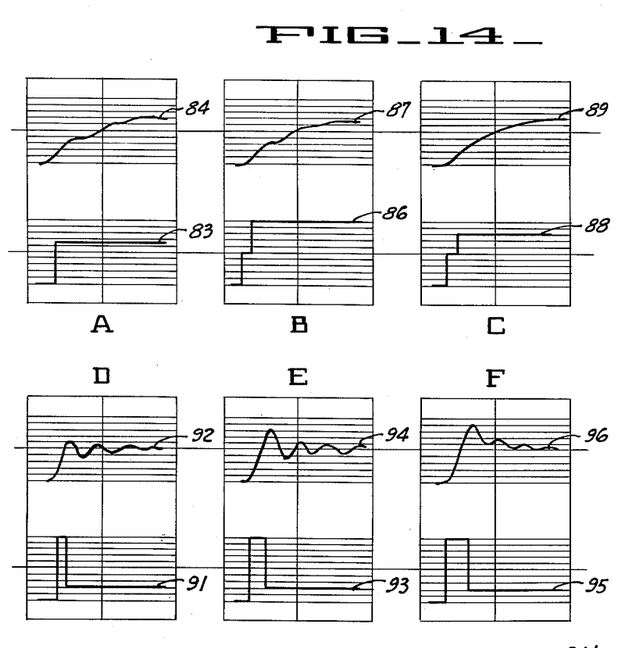
FIGURES 14A, 14B, 14C, 14D, 14E and 14F are oscillograms illustrating various outputs of a different system under test.

Another system tested consisted of an RLC network plus an RC network which resulted in a system with one complex pole pair and one real pole. The results of the tests carried out are shown in FIGURES 14A through 14F. A step function 83 as shown in FIGURE 14A of a single step, that is, the second step was equal to zero, was applied to the system to obtain the step response 84 of the system. After this had been done, a rough estimate was again made of the resonant frequency $\omega_n$ and damping factor ratio to derive the approximate location for the poles. The dials 57 and 58 of the generator 50 were then positioned to apply a two-step function 86 as shown in FIGURE 14B to the system under test. The response 87 indicated that the second step was too early. It will be noted that the phase of the resultant response at the instant of the second step is a little less than 180° lag (almost a negative cosine). Again this corresponded to the third quadrant in phasor diagram. This indicated that the time $T_p$ should be increased and the magnitude of the second step should be decreased in an attempt to obtain perfect cancellation.

A two step function 88 as shown in FIGURE 14C was then applied to the system with the time and magnitude decreased to give a deadbeat response 89 with only the response to the real pole remaining. The dials 57 and 58 were then read to obtain the location of the complex pole. This, as explained previously is the "on time" condition in which the complex zeros cancel the complex poles.

After the readings from the dials 57 and 58 had been obtained, a two-step function 91 as shown in FIGURE 14D was applied to the system under test. The application of this two-step function caused the system to be swept with a real zero in the region of the real pole. The response 92 indicates that the real zero is to the left of the real pole, and that the zero was starting to effect the response contributed by the real pole. The zero was approaching from the left in the $s$-plane. This was noted because of the increased rise time and the increase in oscillation amplitude.

Next, a two step function 93 as shown in FIGURE 14E was applied to the system. The real pole was exactly cancelled by the real zero and only the contribution of the complex poles remained. As will be noted from the figure, the centerline of the oscillation was horizontal. The dials 57 and 58 were read to give the $\alpha$ of the real pole.

Next, a two step function 95 as shown in FIGURE 14F was applied to the system which resulted in a response 96. As will be noted from the figure, in this case the real zero had passed the real pole and was near the origin of the $s$-plane. This fact was borne out by the sharp rise time and the negative slope of the centerline of oscillation. The effect of the real zero dominated that of the real pole.

From examining FIGURES 14D, 14E, and 14F, it will be noted that the response 92 in FIGURE 14D has a rising or increasing centerline; that the response 94 has a horizontal centerline; and that the response 96 has dropping or decreasing centerline. As explained above, the horizontal centerline indicates the optimum condition.

Figure 15:
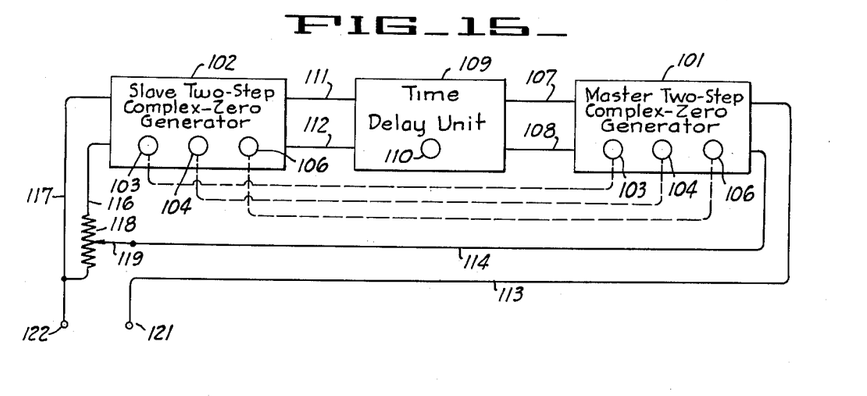
FIGURE 15 is a block diagram of a four-step generator.

Another embodiment of my invention is shown in block diagram form in FIGURE 15. The complex zero signal generator shown in FIGURE 15 is a four-step generator. The generator consists of a pair of two-step complex zero generators 101 and 102 of the type similar to the complex zero generator 50 shown in FIGURE 3. However, in this embodiment each of the complex zero generators is provided with three dials, 103, 104 and 106 which are ganged together rather than the two dials 57 and 58 provided on the complex zero generators 50. The dial 103 corresponds to the dial 57 of the complex zero generator 50 and serves to control the frequency or timing. Dial 106 corresponds to the dial 58 of the complex zero generator 50 and serves to vary the ratio $A/B$. Dial 104 corresponds to the dial 17 of the pulse generator 14 and serves to regulate the amplitude of the pulses. The three dials of both of these generators are ganged together so that when one is operated the other is operated.

The generator 101 is designated as the master generator whereas the generator 102 is designated as the slave generator. Conductors 107 and 108 connect the master generator 101 to a time delay unit 109 and feeds into the time delay unit a signal which is used for synchronizing purposes. The time delay unit includes a dial 110 by which the time delay provided by the unit can be varied. The dial 110 is calibrated in $\beta$ and frequency in accordance with FIGURE 7. The time delay unit is connected to the slave generator 102 by conductors 111 and 112. The output of the master generator is connected to conductors 113 and 114. The output of the slave generator 102 is connected to the conductors 116 and 117. A potentiometer 118 is connected across the conductors 116 and 117. The wiper 119 of the potentiometer is connected to the conductor 114. A pair of output terminals 121 and 122 are provided for the four-step complex zero generator. Terminal 121 is connected to the conductor 113 whereas terminal 122 is connected to the conductor 117.

Operation of this embodiment of my invention may now be briefly described as follows: The master complex zero generator 101 delivers synchronizing pulses on the conductors 107 and 108 to the time delay unit which has the same repetition rate as the pulses which appear on output conductors 113 and 114. The time delay unit 109 delays each one of the pulses applied to it in accordance with the setting of the time delay dial 110, and delivers to conductors 111 and 112 a sequence of pulses whose frequency is equal to the frequency of the sequence of pulses on the conductors 107 and 108 but whose phase has been retarded (i.e. there is a time delay in the appearance of each of these pulses). This delayed sequence of pulses is connected by the conductors 111 and 112 to the slave complex zero generator 102.

The output of the slave complex zero generator 102 which appears on conductors 116 and 117 is a complex zero wave which is exactly equal in wave shape and magnitude of the wave which appears on conductors 113 and 114. It has the same frequency but it does not have the same phase. The wave which appears on conductors 116 and 117 is delayed in time after the wave which appears on the conductors 113 and 114. The slave complex zero generator generally operates at approximately the frequency of the dial setting 103 or at a higher frequency which is a harmonic thereof.

The signals or waves appearing on the conductors 113 and 114 and on 116 and 117 are summed by the potentiometer 118. When the slider or wiper 119 of the poentiometer is at the top, then the output terminals 121 and 122 have applied across them a voltage which is equal to the summation of the voltages appearing on the outputs of the generators 101 and 102. When the wiper or slider 119 is at the bottom of the potentiometer, then the output terminals 121 and 122 have applied across them a voltage equal only to the voltage appearing on the output of the master complex-zero generator 101. None of the output of the slave generator appears across the terminals 121 and 122 in this position of the slider of the potentiometer.

Figure 16:
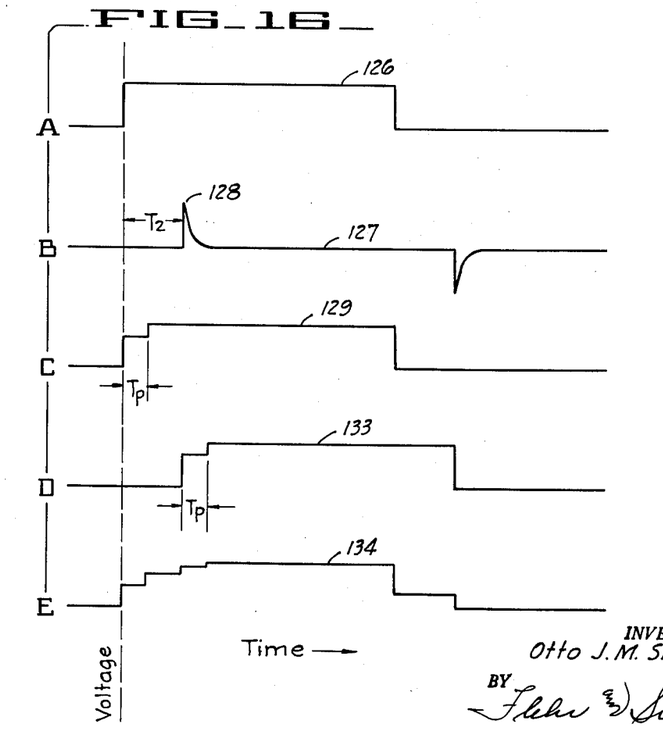
FIGURES 16A, 16B, 16C, 16D and 16E are the output curves of various sections of the four-step generator shown in FIGURE 15.

The output of the various sections of the four-step complex zero generator is shown graphically in FIGURES 16A, 16B 16C, 16D and 16E. The curve 126 in in FIGURE 16A shows the square wave repetition rate of the master complex zero generator 101. The curve 127 is the output from the time delay unit 109 and shows the synchronizing pulses 128 being delay by a time $T_2$. Curve 129 as shown in FIGURE 16C is the output of the master complex zero generator 101 in which the time between steps is designated by $T_p$. The curve 133 in FIGURE 16D is the output of the slave complex zero generator 102 and shows a wave form similar to that in FIGURE 16C except that it is delayed in time with respect to the wave form in FIGURE 16C by a time $T_2$. The curve 134 in FIGURE 16E is the sum of the outputs of the master complex zero generator and the slave complex zero generator after the curve 133 has been attenuated by the potentiometer 118. The dial for the slider 119 is calibrated in $\zeta$ and $\zeta_n$ in accordance with the curves in FIGURE 8. The curve 134 in FIGURE 16E is the convolution of two different curves as is the curve in FIGURE 4B.

The four-step complex zero generator shown in FIGURE 15 can be utilized in a system similar to that shown in FIGURE 3. Such a four-step generator is particularly useful when two resonant frequencies are very close together because without such a generator it is difficult to obtain a pattern which is easily interpreted by the eye. In using the four-step generator in such a system, the relationship between the timing and the amplitudes of the four-step functions is chosen so that they can be adjusted by the ganged dials 103 and 106 on the generators 101 and 102, the dials 103 reading the resonant frequencies and the dials 106 reading the corresponding damping factors. The four-step function produced is used to cancel simultaneously two different resonant frequencies in the system under test. It can also be used to cancel completely the oscillations produced by a second order complex pole pair.

It should be noted that when either of the dials 106 which reads damping is set for an infinite damping, the four-step output signal appearing across the terminals 121 and 122 will degenerate into a two-step output signal. For example, when the dials 106 which are ganged together are set for infinite damping there will appear across the output of each of the generators 101 and 102 a square wave and not a two-step repeated wave. The attenuator 118 will reduce the amplitude of the square wave from the wave generator 102 such that the sum of the two square waves appearing across the output terminals 121 and 122 will be a repeated complex zero wave. The frequency and damping corresponding to these complex zeros will be given by the dial 110 and the setting of the attenuator arm or wiper 119.

Figure 17:
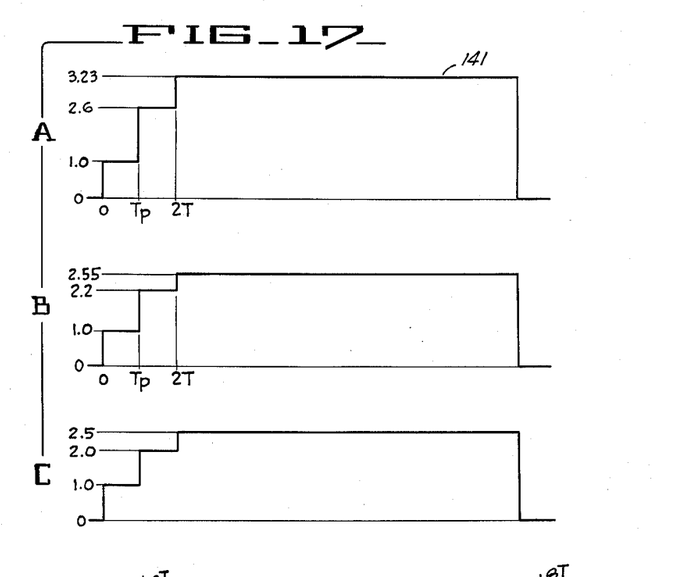
FIGURES 17A, 17B and 17C are the output curves from a three-step complex zero generator.
Figure 18:
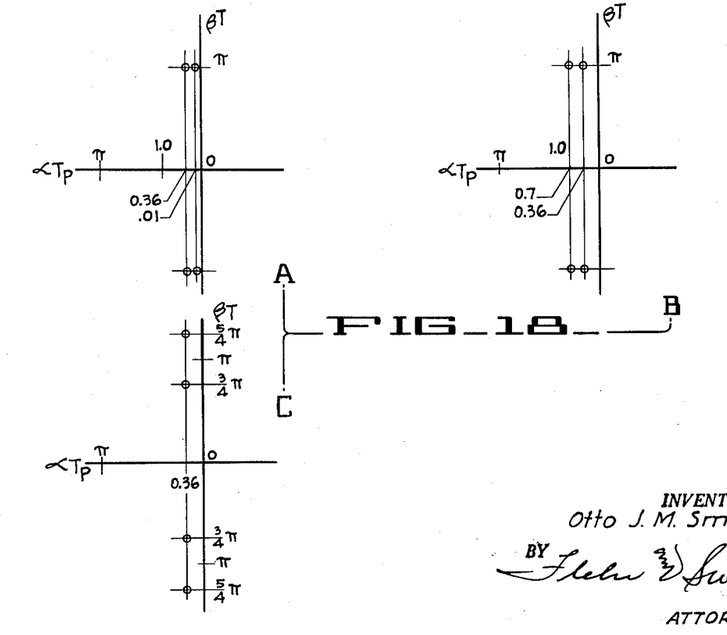
FIGURES 18A, 18B, and 18C are $s$-plane representations showing the location of the zeros generated in the curves shown in FIGURE 17A, 17B and 17C.

It is readily apparent that since means have been disclosed for producing two-step wave forms and four-step wave forms that it may also be desirable to produce three-step wave forms. Such a complex zero generator would have an output like that shown in FIGURE 17A which shows a curve 141 with three steps. There are two sets of complex zeros in the Laplace transform of such a three-step wave. FIGURE 18A shows the $s$-plane location of the zeros generated. By varying the relative magnitudes of the three steps, these zeros can be moved to different $\alpha$ values. For example, FIGURE 17B shows a different wave and FIGURE 18B shows the zero locations. By varying the value of the timing $T_p$, the $\beta$ value for the zeros can be adjusted.

FIGURE 17C shows another output wave from such a complex zero generator. The corresponding zero locations are as shown in FIGURE 18C. By adjusting the output of this complex zero generator, it is apparent that two sets of complex poles in the system can be simultaneously cancelled, permitting the measurement of either a second order of complex poles or doubly-resonant systems with the same frequency for the two pole pairs, or the same damping for the two pole pairs. Thus, a three-step generator can be used to cancel completely the oscillations produced by second order complex pole pair or it can be used to measure certain classes of two pole pairs or two resonances. If the two resonances have exactly the same transient frequency, but different dampings, then a three-step generator can be used to measure these different dampings and the resonant frequency. Also, if a set of two complex poles has exactly the same damping factor in units of per unit per second, that is, these complex poles have the same horizontal coordinates in the Laplace $s$-plane, even though their frequencies are different, a three-step generator can cancel out these two frequencies and the beat between them and measure the frequencies and their damping.

Figure 19:
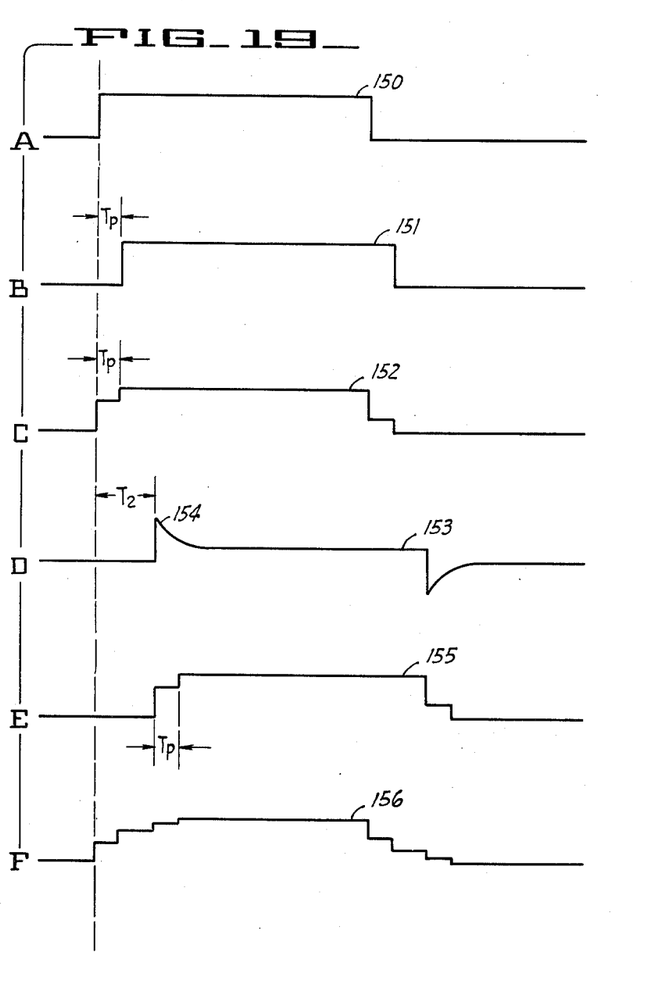
FIGURES 19A, 19B, 19C, 19D, 19E and 19F are the wave shapes of the time functions appearing in various sections of the four-step generator shown in FIGURE 15 modified to produce amplitude-symmetrical waves.

The complex zero generator in FIGURE 1, and the adaptation of it shown in FIGURE 15 have a negative-going wave shape which is different from the positive-going wave shape. These polarity-unsymmetrical waves are shown in FIGURES 2C, 16C, 16D, 16E, 17A, 17B, and 17C. A complex zero generator can be built to deliver a wave which is symmetrical with respect to polarity. This generator is also constructed like FIGURE 1. The square wave generator 11 consists of a conventional type like Hewlett-Packard 211A or Measurements Corporation Model 71. Its output is shown as wave 150 in FIGURE 19A. The pulse generator 14 is another square wave generator tuned to the same frequency and receiving synchronizing pulses from a Tektronix Type 161 pulse generator operating as a delay generator. The output of pulse generator 14 is the square wave 151 shown in FIGURE 19B.

The time delay $T_p$ is produced by the Tektronix pulse generator. The weighted sum of waves 150 and 151 is delivered as a voltage from terminal 41 to 26, which voltage is shown as wave 152 in FIGURE 19C. This wave has repetitive complex zeros and is symmetrical with respect to polarity. It can be used in the same manner to test systems as has been previously described.

Two complex zero generators of the type described in the previous paragraph, delivering polarity-symmetrical waves, can be combined as shown in FIGURE 15 to produce a four-step wave which can be used to cancel two different resonances in a system under test. The output of the master generator 101 is the wave 152 in FIGURE 19C. The time delay unit 109 produces the synchronizing wave 153 with pulse 154 shown in FIGURE 19D. The pulse 154 occurs at time $T_2$ after the positive-going discontinuity in wave 150. The time $T_2$ is adjustable with dial 110 of the time delay unit. Wave 153 provides the synchronizing signal for the slave generator 102. The output of the slave generator 102 is the complex zero wave 155 shown in FIGURE 19E. Because the master and the slave generator have ganged controls, wave 155 is identical to wave 152 except that it is delayed by the time $T_2$. The weighted sum of waves 152 and 155 is produced by the potentiometer 119 and appears as a voltage between 121 and 122. This voltage is the wave 156 in FIGURE 19F. It is a repetitive sequence of four-step patterns, each four-step pattern producing two columns of complex zeros in the $s$-plane. Each column can be used to cancel one system resonance, so that the wave in 156 can be used to simultaneously cancel two different system resonances.

It is apparent from the foregoing that I have provided an apparatus and method for generating a signal and a system and method for utilizing the signal generated to directly determine the system characteristic pole locations. The tedious process of taking steady state frequency response and/or transient response data, synthetizing equations, and factoring these equations to find an analytical description of a system is, therefore, no longer required. My invention permits high accuracy measurements in systems with low Q's.

My invention is also applicable to audio, sub-audio and servo-mechanism frequencies. Although the present invention has been discussed in conjunction with electrical systems, it is readily apparent to those skilled in the art that the principles disclosed herein are applicable to other types of control systems as for example, hydraulic and pneumatic control systems. Hydraulic and pneumatic generators of the type herein disclosed can be readily built to deliver two steps or a double-step of pressure in the same way that a double-step or two-step electrical signal is produced. The hydraulic generator would deliver the double-step of pressure into a fluid whereas the pneumatic generator would deliver the double-step of pressure into a gas.

I claim:

1. In a signal generator, means for generating a repetitive square wave signal, means for generating an additional repetitive signal with a repetition rate integrally related to the repetition rate of the first named signal, the additional signal having two amplitude values and changing suddenly between the two amplitude values, means for synchronizing the additional signal with respect to the first named signal to thereby control the timing of the additional signal with respect to the first named signal, means for adding the first named signal and the additional signal to produce a combined repetitive signal with at least first, second and third successive step functions in each cycle and a wave shape which has first and second plateaus after the first and second step functions with the second plateau being significantly longer in time than the first plateau, means for adjusting the amplitudes of the first named signal and the additional signal during the operation of the signal generator, means for adjusting the ratios of the amplitudes of the first named signal and the additional signal during operation of the signal generator and load isolating means connected to the means for adjusting the ratios of amplitudes.

2. A signal generator as in claim 1 wherein said additional signal is in the form of pulses together with means for varying the repetition rate of the square wave and means for varying the pulse width of the pulses during operation of the signal generator.

3. A signal generator as in claim 2 wherein said means for adjusting the ratios of the amplitudes is calibrated in units of a dimensionless damping ratio $\zeta_n$ and the means for adjusting the pulse width is calibrated in units of frequency.

4. In a complex zero generator, a square wave generator for generating a repetitive square wave, a pulse generator for generating a repetitive pulse with a repetition rate integrally related to the repetition rate of the repetitive square wave, means connecting the output of the square wave generator to the pulse generator to synchronize the pulse generator with the square wave generator to thereby control the timing of the pulses with respect to the timing of the square waves, the square wave generator including means for adjusting the frequency and amplitude of the square waves produced thereby during operation of the square wave generator, the pulse generator including means for adjusting the width and amplitude of the pulses produced thereby during operation of the pulse generator, means for linearly adding the outputs of the square wave generator and the pulse generator to produce a combined signal with at least three repetitive step functions in each cycle and a wave shape which is substantially flat between the step functions to provide first and second plateaus and with a value after the second step function different from the value before the first step function, the second plateau being significantly longer in time than the first plateau, and means for adjusting the ratio of the amplitudes of the square waves and the pulses during operation of the complex zero generator.

5. In a complex zero generator, a master complex zero generator producing an output signal with at least first, second and third step functions in each cycle and a wave shape which is substantially flat between the step functions to provide first and second plateaus and with a value after the second step function different from the value before the first step function, the second plateau being significantly longer in time than the first plateau, a slave complex zero generator producing an output signal substantially identical to the output signal from the master complex zero generator, time delay means connecting the master generator and the slave generator so that the output signal of the slave generator is delayed in time with respect to the output signal of the master generator, means for adding the output signals of the master generator and the slave generator, and means for adjusting the ratios of the amplitudes of the output signals of the master generator and the slave generator during operation of the complex zero generator, each of said complex zero generators being substantially identical and consisting of a square wave generator for generating a repetitive square wave, a pulse generator for generating repetitive pulses with a repetition rate integrally related to the repetition rate of the square wave, means synchronizing the pulse generator with the square wave generator to thereby control the timing of the pulses with respect to the timing of the square waves, means for varying the time duration of the pulses, means for adjusting the amplitude of the pulses, and means for adjusting the ratio of the amplitudes of the pulses and the square waves.

6. A complex zero generator as in claim 5 wherein said means for adjusting the time duration of the pulses, means for adjusting the amplitude of the pulses and the means for adjusting the ratios of the amplitudes of the pulses and the square waves in the master generator are ganged to the identical means in said slave generator and are operable during operation and use of the complex zero generator.

7. In a signal generator, means for generating a repetitive signal of a generally square shape, means for generating an additional repetitive signal of generally square shape with a repetition rate integrally related to the repetition rate of the first named signal, means for manually adjusting the timing of the additional repetitive signal with respect to the first named repetitive signal, means for manually adjusting the ratio of the amplitude of the additional signal with respect to the amplitude of the first named signal during operation of the signal generator, and means for adding the first named signal and the additional signal to produce a combined signal with at least first, second and third step functions in each cycle and a wave shape which is substantially flat between the step functions to provide first and second plateaus and with a value after the second step function different from the value before the first step function, the second plateau being substantially longer in time than the first plateau.

8. A signal generator as in claim 7 wherein said first named signal is a repetitive square wave and wherein said additional signal is a repetitive square wave of the same frequency as the first named signal.

9. A signal generator as in claim 7 wherein said means for manually adjusting the timing of said additional repetitive signal includes a manually operated dial calibrated in units of frequency.

10. A signal generator as in claim 7 wherein said means for manually adjusting the ratio of the amplitude of the additional signal includes a manually operated dial calibrated in units of damping.

11. A signal generator as in claim 7 wherein said means for manually adjusting the ratio of the amplitude of the additional signal includes a manually operated dial calibrated in units of Q.

12. A signal generator as in claim 9 wherein said units of frequency are from the real part of the logarithm of the Laplace variable $s$.

13. A signal generator as in claim 10 wherein units of damping are from the imaginary part of the logarithm of the Laplace variable $s$.

14. In a signal generator, means for generating a repetitive signal having a substantially square shape, means for generating an additional repetitive signal having a substantially pulse shape with a repetition rate integrally related to the repetition rate of the first named signal, means for manually adjusting the timing of the additional repetitive signal with respect to the first named repetitive signal during operation of the generator, means for manually adjusting the ratio of the amplitude of the additional repetitive signal with respect to the first named repetitive signal during operation of the generator, means for manually adjusting the pulse length in the additional repetitive signal, means for adding the first named signal and the additional signal to produce a combined signal with at least first, second and third step functions in each cycle and a wave shape which is substantially flat between the step functions and with a value after the second step function different from the value before the first step function, the timing interval between the first and second step functions being relatively small in comparison to the time represented by one-half cycle of the repetition rate of the combined signal.

15. A signal generator as in claim 14 wherein the repetition rate of the additional repetitive signal is equal to the repetition rate of the first named signal.

16. A signal generator as in claim 14 wherein the means for manually adjusting the pulse length of the additional repetitive signal includes a manually operated dial which is calibrated in units of frequency.

17. A signal generator as in claim 14 wherein said means for manually adjusting the ratio of the amplitude of the additional repetitive signal includes a manually operated dial calibrated in units of damping taken from the imaginary part of the logarithm of the Laplace variable $s$.

18. A signal generator as in claim 14 wherein the means for manually adjusting the ratio of the amplitude of the additional signal includes a manually operated dial which is calibrated in units of resonant rise Q taken from the imaginary part of the logarithm of the Laplace variable $s$.

19. A signal generator as in claim 14 wherein the means for manually adjusting the ratio of the amplitude of the additional repetitive signal includes a manually operated dial calibrated in units of angular measure.

20. In a method for generating a signal containing complex zeros, generating a repetitive wave with each cycle of the wave being identical, each cycle of the wave consisting of at least three step functions with the wave shape between the step functions being substantially flat to provide first and second plateaus with the second plateau being substantially longer in time than the first plateau by an order of magnitude, manually adjusting the heights of the step functions and manually adjusting the timing between the step functions to obtain the aforementioned wave shapes during operation of the repetitive wave.

21. In a method for generating a signal containing complex zeros, generating a signal having at least three step functions in a cycle and with a wave shape substantially flat between the step functions to provide first and second plateaus and having a magnitude after the second step function different from the magnitude before the first step function, the second plateau being substantially longer in time than the first plateau, generating an additional signal having a wave shape substantially identical to the signal of the first named generator, adding the two signals from the generators to produce a signal having a plurality of step functions in each cycle with the wave shape between the step functions being substantially flat.

22. In an apparatus for determining the characteristic pole locations of a system under test, a complex zero generator connected to the system under test and serving to supply a signal to the input of the system to excite a transient response in the system, the signal having at least first, second and third step functions in each cycle with the wave shape between the step functions being substantially flat and with a magnitude after the second step function different from the magnitude before the first step function, the timing interval between the first and second step functions being small in comparison to one half cycle of the repetition rate of the three step functions and being approximately equal to one-half of the period of one of the oscillatory components of said transient response, and visual display means connected to the output of the system for indicating when a minimum of any transient component has been found.

23. In a method for determining the characteristic Laplace transform pole locations of a system under test, applying a stepped signal with Laplace transform complex zeros therein into the system to excite a transient response in the system, the signal having at least first, second and third step functions in each cycle and with a wave shape between step functions which is substantially flat to provide first and second plateaus and with a magnitude after the second step function different from the magnitude before the first step function, the second plateau being substantially longer in time than the first plateau, measuring the transient response of the system, adjusting the complex zeros until they are superimposed on top of the system poles by manually varying the magnitude and the timing of the step functions in the signal.

24. In a complex zero generator, a square wave generator for generating a repetitive square wave, a pulse generator for generating a repetitive negative pulse with a repetition rate integrally related to the repetition rate of the repetitive square wave, means connecting the output of the square wave generator to the pulse generator to synchronize the pulse generator with the square wave generator to thereby control the timing of the pulses with respect to the timing of the square waves, the negative going step of the pulse being synchronized with the positive going step of the square wave, the square wave generator including means for adjusting the frequency and amplitude of the square waves produced thereby during operation of the complex zero generator, the pulse generator including means for adjusting the width and amplitude of the pulses produced thereby during operation of the complex zero generator, means for combining the outputs of the square wave generator and the pulse generator to produce a combined signal having repetitive first and second steps having a positive polarity and a third step of negative polarity and a wave shape which is substantially flat between the step functions to provide first and second plateaus, the second plateau being significantly longer in time than the first plateau, and means for adjusting the ratio of the amplitudes of the square waves and the pulses during operation of the complex zero generator to thereby adjust the amplitudes of the first and second steps, the combined signal having a complex zero in the right-hand $s$-plane when the second step is greater in amplitude than the first step and a complex zero in the left-hand $s$-plane when the amplitude of the second step is less than the amplitude of the first step.

25. In a signal generator, a square wave generator for generating a repetitive square wave, a pulse generator for generating a repetitive positive pulse with the repetition rate integrally related to the repetition rate of the repetitive square wave, means connecting the output of the square wave generator to the pulse generator to synchronize the pulse generator with the square wave generator to thereby control the timing of the pulses with respect to the timing of the square waves, the positive-going step of the pulse being synchronized with the positive-going step of the square wave, the square wave generator including means for adjusting the frequency and the amplitude of the square waves produced thereby during operation of the signal generator, the pulse generator including means for adjusting the width and amplitude of the pulses produced thereby during operation of the signal generator, means for combining the outputs of the square wave generator and the pulse generator to produce a combined signal with a first step of positive polarity, a second step of negative polarity and a third step of negative polarity and a wave shape which is substantially flat between the steps to provide first and second plateaus in which the second plateau is significantly longer in time than the first plateau, and means for adjusting the ratio of the amplitudes of the square waves and the pulses during operation of the signal generator to thereby adjust the amplitudes of the steps, the combined signal producing a real zero for use in canceling poles which lie on the real axis of the Laplace s-plane.

26. In apparatus for determining characteristic pole locations of a system under test having at least one time constant, a complex zero generator connected to the system under test and serving to supply a signal to the input of the system to excite a transient response in the system, the signal having first, second and third step functions in each cycle with the wave shape between the step functions being substantially flat to provide first and second plateaus and with a magnitude after the second step function different from the magnitude before the first step function, the second plateau being substantially longer in time than the first plateau, and visual display means connected to the output of the system indicating when a minimum of any transient component has been found, said complex zero generator including means for adjusting the magnitude of the step functions and the width of the step functions during operation of the apparatus to thereby permit adjusting the position of at least one Laplace transform zero in the signal until it is superimposed on top of one of the Laplace transform system poles.

27. Apparatus as in claim 26 wherein the first and second step functions have the same polarity.

28. Apparatus as in claim 26 wherein said first and second step functions have opposite polarity.

29. In a method for determining characteristic Laplace transform pole locations of a system under test, applying a stepped signal with Laplace transform complex zeros therein into the system to excite a transient response in the system, the signal having first, second and third step functions in each cycle and a wave shape between step functions which is substantially flat to provide first and second plateaus with the second plateau being substantially longer in time than the first plateau, measuring the transient response of the system, changing the timing of the step functions until a minimum in the envelope of oscillation is measured, changing the ratio of amplitude of the first step function to the second step function to reduce the transient response to a minimum, and repeating the steps of changing the frequency and changing the ratio of the amplitudes of the step functions until one of the frequencies in the transient is completely removed from the transient.

30. A method as in claim 29 together with the steps of determining the frequency and damping of the frequency component removed by a measure of the adjustments which have been made to obtain the transient in which said frequency component has been removed.

31. In a signal generator, means for generating a repetitive substantially square wave signal, means for generating an additional repetitive signal with a repetition rate integrally related to the repetition rate of the first named signal, the additional signal having two amplitude values and changing suddenly between the two amplitude values, means for adding the first named signal and the additional signal to produce a combined signal with at least first, second and third repetitive step functions in each cycle and having a wave shape which is substantially flat between the step functions and with a final value after the second step function different from the value before the first step function, the timing between the first and second step functions being relatively small in comparison to the length of time represented by one half cycle of the repetition rate of the combined signal, and means for manually synchronizing the additional signal with respect to the first named signal to thereby control the timing of the additional signal with respect to the first named signal.

32. In a signal generator, means for generating a repetitive substantially square wave signal, means for generating an additional repetitive signal with a repetition rate integrally related to the repetition rate of the first named signal, the additional signal having two amplitude values and changing suddenly between the two amplitude values, means for adding the first named signal and the additional signal to produce a combined signal with at least first, second and third repetitive step functions in each cycle and having a wave shape which is substantially flat between the step functions and with a final value after the second step function different from the value before the first step function, the timing between the first and second step functions being relatively small in comparison to the length of time represented by one half cycle of the repetition rate of the combined signal, the additional signal being in the form of repetitive pulses, and means for adjusting the pulse width of the repetitive pulses during operation of the signal generator, said last named means being calibrated in units of frequency.

33. In a method for generating a signal containing complex zeros, generating a repetitive signal having a substantially square wave shape, generating an additional repetitive signal with a repetition rate integrally related to the repetition rate of the first named repetitive signal, the additional signal having two amplitude values and changing suddenly between the two amplitude values, and adding the first named signal and the additional signal to produce a combined repetitive signal with at least first, second and third step functions in each cycle and a wave shape which is substantially flat between the step functions to provide first and second plateaus and with a value after the second step function different from the value before the first step function, the second plateau being substantially longer in time than the first plateau, and manually adjusting the ratios of the amplitudes of the first named signal and the additional signal during generation of the signals to thereby vary the amplitudes of the step functions.

34. In a method for generating a signal containing complex zeros, generating a repetitive substantially square wave, generating a repetitive pulse with a repetition rate integrally related to the repetition rate of the square wave, adjusting the amplitudes of the square waves and the pulses, adding the square waves and the pulses to produce a combined signal having at least first, second and third step functions in each cycle and a wave shape which is substantially flat between the step functions and having a magnitude after the second step function different from the magnitude before the first step function, the timing interval between the first and second step functions being relatively small in comparison with the time represented by one half cycle of the repetition rate of the combined signal, manually adjusting the ratio of the amplitudes of the square waves and the pulses during generation of the same to thereby adjust the relative magnitudes of the step functions, manually adjusting the frequency of the square wave, and manually adjusting the width of the pulses to obtain the desired signal.

35. In an apparatus for determining the characteristic pole locations of a system under test, a complex zero generator connected to the system under test and serving to supply a signal to the input of the system to excite a transient response in the system, the signal having at least first, second and third step functions in each cycle with the wave shape between the step functions being substantially flat and with a magnitude after the second step function different from the magnitude before the first step function, the timing interval between the first and second step functions being small in comparison to one half cycle of the repetition rate of the three step functions, and visual display means connected to the output of the system for indicating when a minimum of any transient component has been found, said complex zero generator including means for manually adjusting the magnitudes of the step functions and the width of the step functions during operation of the apparatus to thereby permit adjusting the position of at least one Laplace transform zero in the signal until it is superimposed on top of one of the Laplace transform system poles.

36. In a signal generator, means for generating a repetitive substantially square wave signal, means for generating an additional repetitive signal with a repetition rate integrally related to the repetition rate of the first named signal, the additional signal having two amplitude values and changing suddenly between the two amplitude values, means for adding the first named signal and the additional signal to produce a combined signal with at least first, second and third repetitive step functions in each cycle and having a wave shape which is substantially flat between the step functions and with a final value after the second step function different from the value before the first step function, the timing interval between the first and second step functions being relatively small in comparison to the length of time represented by one half cycle of the repetition rate of the combined signal, and means for reversing the polarity of the additional repetitive signal.

37. In a signal generator, means for generating a repetitive substantially square wave signal, means for generating an additional repetitive signal with a repetition rate integrally related to the repetition rate of the first named signal, the additional signal having two amplitude values and changing suddenly between the two amplitude values, and means for adding the first named signal and the additional signal to produce a combined signal with at least first, second and third repetitive step functions in each cycle and having a wave shape which is substantially flat between the step functions and with a final value after the second step function different from the value before the first step function, the timing interval between the first and second step functions being relatively small in comparison to the length of time represented by one half cycle of the repetition rate of the combined signal, the first step function being produced from the square wave signal and being a positive step, the second step function being produced from the additional repetitive signal and being a negative step.

38. In a signal generator, means for generating a repetitive substantially square wave signal, means for generating an additional repetitive signal with a repetition rate integrally related to the repetition rate of the first named signal, the additional signal having two amplitude values and changing suddenly between the two amplitude values, and means for adding the first named signal and the additional signal to produce a combined signal with at least first, second and third repetitive step functions in each cycle and having a wave shape which is substantially flat between the step functions and with a final value after the second step function different from the value before the first step function, the timing interval between the first and second step functions being relatively small in comparison to the length of time represented by one half cycle of the repetition rate of the combined signal, the first step function being produced from the square wave signal and being a positive step, the second step function being produced from the additional repetitive signal and being a positive step.

References Cited in the file of this patent

UNITED STATES PATENTS

| 2,499,413 | Proskauer et al. | Mar. 1, 1950 |
| 2,522,239 | Shepard | Sept. 12, 1950 |
| 2,646,545 | King | July 21, 1953 |
| 2,666,179 | Maxwell | Jan. 12, 1954 |
| 2,733,433 | Morrison | Jan. 31, 1956 |
| 2,870,372 | Harris | Jan. 20, 1959 |
| 2,874,280 | McCulley | Feb. 17, 1959 |
| 2,881,388 | Behrend | Apr. 7, 1959 |
| 2,887,575 | Luther | May 19, 1959 |
| 2,945,177 | Moren | July 12, 1960 |

OTHER REFERENCES

Waidelich: "Steady-State Testing with Saw-Tooth Waves," Proceedings of the I.R.E., June 1944, pp. 339–348.